(12) United States Patent
Underwood

(10) Patent No.: US 8,786,153 B2
(45) Date of Patent: Jul. 22, 2014

(54) KINETIC ENERGY ACCUMULATOR AND AN ENERGY TRANSFER SYSTEM INCORPORATING A KINETIC ENERGY ACCUMULATOR

(75) Inventor: Perry John Underwood, Arundel (AU)

(73) Assignee: Power 4 Country Pty Limited, Arundel (AU)

( * ) Notice: Subject to any disclaimer, the term of this patent is extended or adjusted under 35 U.S.C. 154(b) by 771 days.

(21) Appl. No.: 12/675,360

(22) PCT Filed: Aug. 29, 2008

(86) PCT No.: PCT/AU2008/001264
§ 371 (c)(1),
(2), (4) Date: Feb. 25, 2010

(87) PCT Pub. No.: WO2009/026633
PCT Pub. Date: Mar. 5, 2009

(65) Prior Publication Data
US 2010/0307285 A1     Dec. 9, 2010

(30) Foreign Application Priority Data
Aug. 29, 2007   (AU) ................................ 2007904667

(51) Int. Cl.
*F16D 27/01* (2006.01)
*H02K 49/10* (2006.01)
*F16D 43/04* (2006.01)
*H02K 53/00* (2006.01)
*F16F 15/30* (2006.01)

(52) U.S. Cl.
USPC ............... 310/103; 310/101; 310/152; 74/64; 464/29

(58) Field of Classification Search
USPC ......... 192/48.7, 52.1, 84.3; 310/103, 97, 101, 310/112, 152; 464/29; 74/64
See application file for complete search history.

(56) References Cited

U.S. PATENT DOCUMENTS

| 2,745,975 | A | * | 5/1956 | Zozulin et al. ................ 310/100 |
| 3,892,136 | A | | 7/1975 | MacDonald |
| 4,195,721 | A | * | 4/1980 | Shea ...................... 192/105 CD |
| 4,239,975 | A | | 12/1980 | Chiappetti |

(Continued)

FOREIGN PATENT DOCUMENTS

| EP | 0610503 B1 | 3/1996 |
| WO | 02/31370 A1 | 4/2002 |

*Primary Examiner* — Burton Mullins
(74) *Attorney, Agent, or Firm* — Pearne & Gordon LLP

(57) ABSTRACT

The invention relates to a kinetic energy accumulator, comprising a plurality of rotatably mounted accumulator members (100, 198) positioned adjacent one another, an input drive mechanism (116) arranged to impart rotational drive to a first of the accumulator members, and velocity responsive coupling members (106, 192) arranged to provide for magnetic coupling of successive ones of the accumulator members when respective ones of the accumulator members are caused successively to rotate with an angular velocity equal to, or greater than, a predetermined velocity. The accumulator can store kinetic energy and thereby act as source of rotational drive. Hence, there is also provided a kinetic energy transfer system, comprising the kinetic energy accumulator (118), an energy transmitter mechanism arranged to apply drive from a kinetic energy source to the input drive mechanism (116) of the energy accumulator; and a load device coupled to, and arranged to be driven by, the energy accumulator when each of the accumulator members is rotating with an angular velocity equal to, or greater than, the predetermined velocity. The load device can be an electric generator or other device.

17 Claims, 16 Drawing Sheets

(56) References Cited

U.S. PATENT DOCUMENTS

| | | | |
|---|---|---|---|
| 5,013,949 A | 5/1991 | Mabe, Jr. | |
| 5,590,568 A | 1/1997 | Takara | |
| 5,691,587 A * | 11/1997 | Lamb | 310/103 |
| 5,717,266 A * | 2/1998 | Maynard, Jr. | 310/103 |
| 5,747,902 A | 5/1998 | Takara | |
| 6,767,161 B1 | 7/2004 | Calvo et al. | |
| 6,858,958 B2 | 2/2005 | Schrotter | |
| 7,024,963 B2 * | 4/2006 | French | 74/665 F |
| 7,528,514 B2 * | 5/2009 | Cruz et al. | 310/103 |
| 2004/0046468 A1 | 3/2004 | Schrotter | |
| 2007/0278063 A1 * | 12/2007 | Hsu | 192/41 S |

* cited by examiner

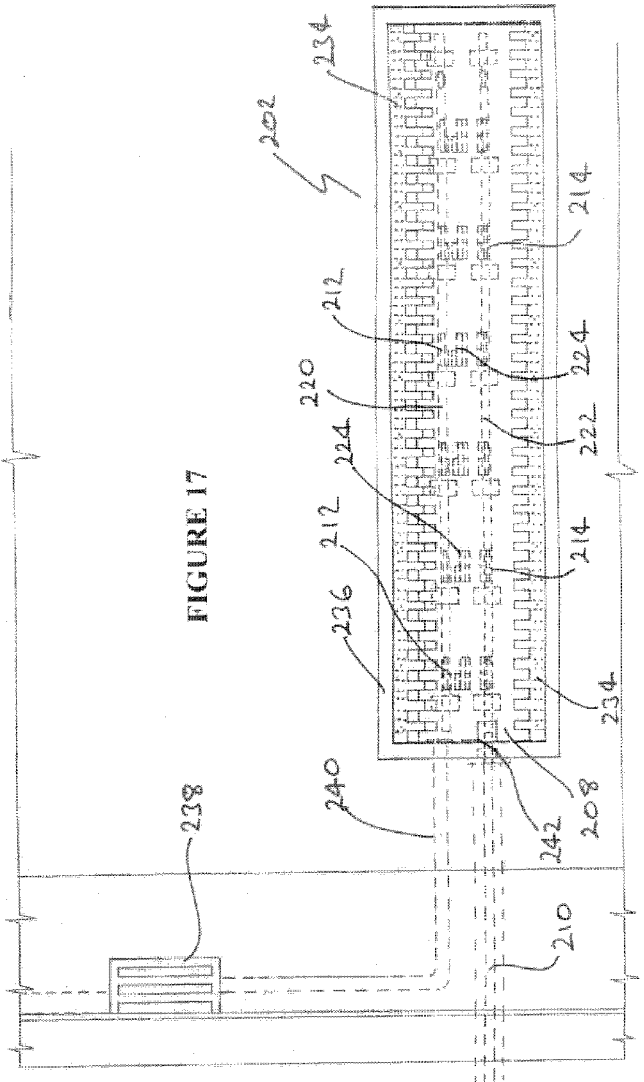
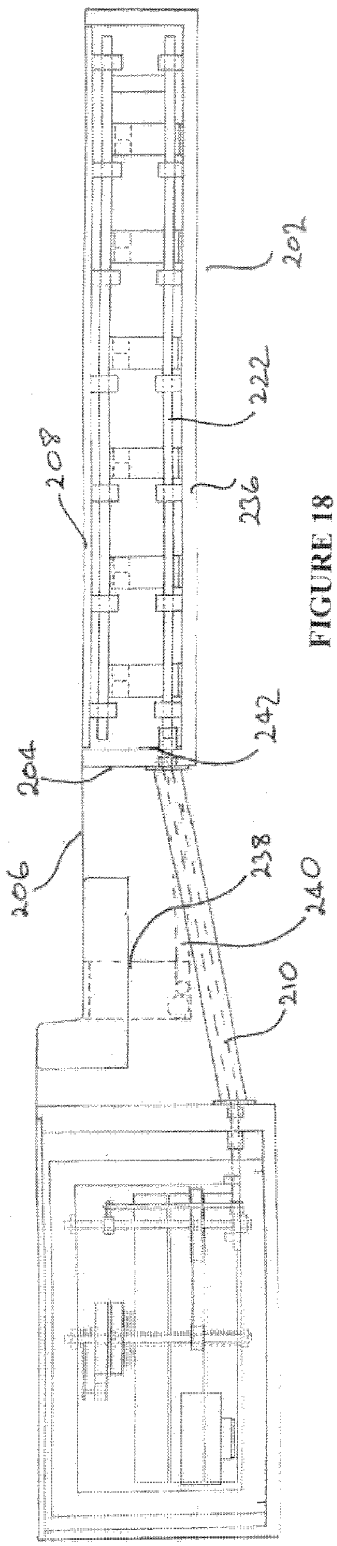
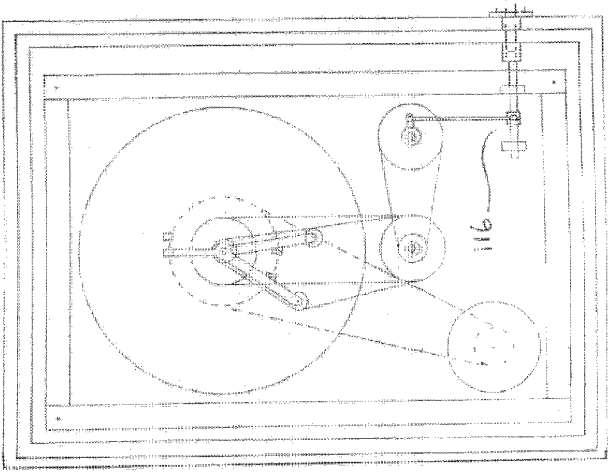

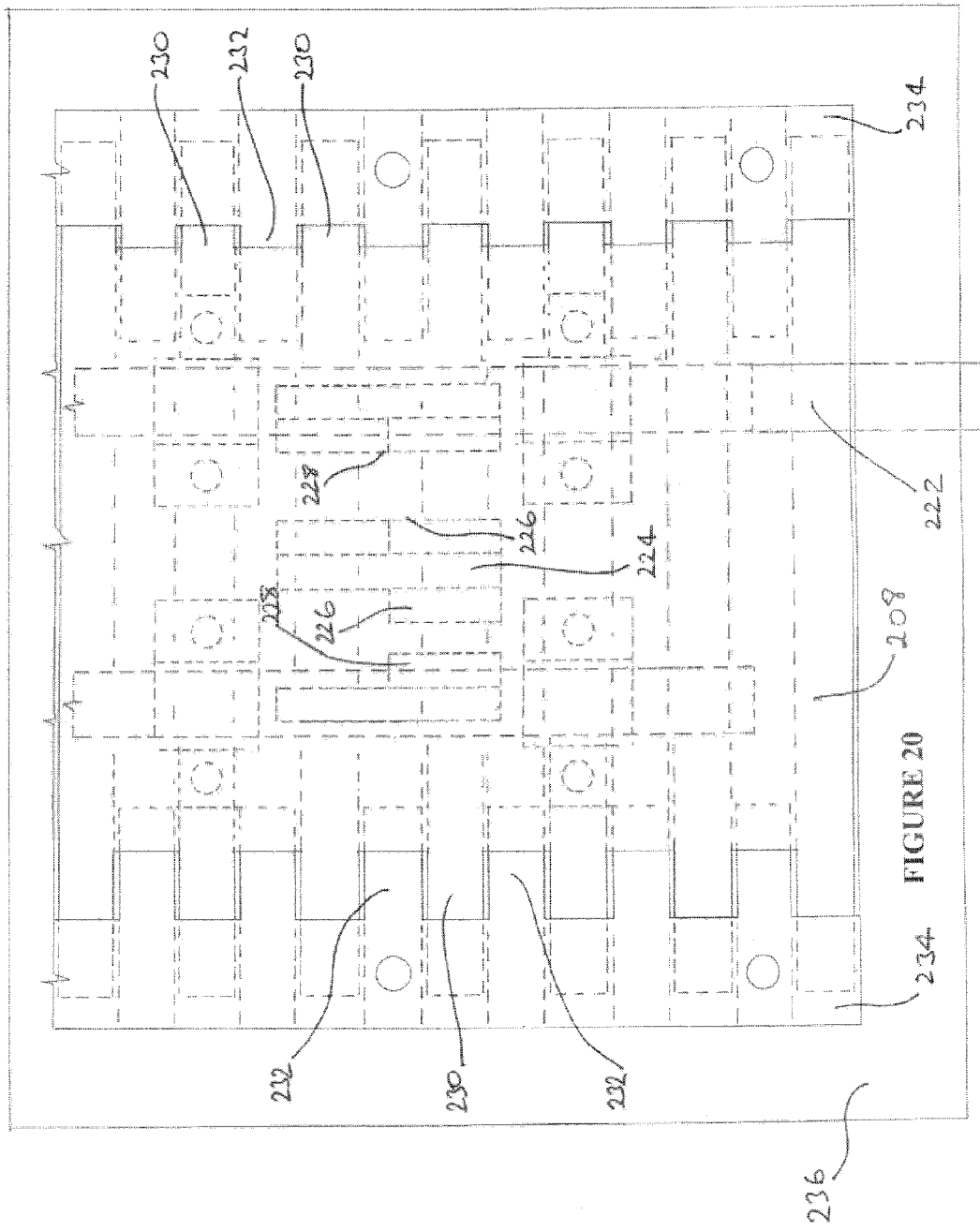

KINETIC ENERGY ACCUMULATOR AND AN ENERGY TRANSFER SYSTEM INCORPORATING A KINETIC ENERGY ACCUMULATOR

FIELD OF THE INVENTION

This invention relates to a kinetic energy accumulator and, in one of its embodiments, to an energy transfer system incorporating such accumulator.

BACKGROUND OF THE INVENTION

Various types of kinetic energy accumulators are known, including those that embody the flywheel principle, for use in systems that require the accumulation and/or smoothing of (regular or irregular) oscillatory or pulsating energy in its transfer from a source to a load. Similarly, various types of energy transfer systems, some of which incorporate accumulators, have been proposed for transferring kinetic energy from moving vehicles to electrical or fluid-pressure generators. In this context reference is made to the disclosures of U.S. Pat. No. 4,239,975 (Chiappetti) filed 30 Apr. 1979 and U.S. Pat. No. 6,767,161 (Calvo et al) filed 2 Dec. 2002.

U.S. Pat. No. 5,590,568 (Takara) granted 7 Jan. 1997 describes a flywheel energy storage system for being driven by a low output electrical motor and comprising a plurality of spaced apart flywheels in the form of rotatable plates arranged one on top of another and having a common axis of rotation. Permanent magnets are mounted in alignment on adjacent ones of the plates so as to be in opposing (repulsively poled) orientation. The motor drives rotation of a first of the flywheels and thereby the rotation of the subsequent flywheels by virtue of the magnetic repulsive force between the aligned permanent magnets mounted on successive flywheels. However, the flywheels are all driven at the same time by the motor to accumulate kinetic energy in the system, making the system inefficient.

The accumulator of the present invention (as below defined) is described in relation to an energy transfer system of a type in which kinetic energy is derived from moving vehicles, and the invention is hereinafter described by way of example in that context. However, it is to be understood that the invention has broader application, to an accumulator per se and to an energy transfer system that utilises any one of a number of sources that possess kinetic energy, including moving humans or other animals, waves, ocean swells or tides, road vehicles and mechanical devices or systems that perform repetitive movements.

SUMMARY OF THE INVENTION

Broadly stated, in one aspect of the invention there is provided a kinetic energy accumulator for providing rotational drive, comprising:

(a) a plurality of rotatably mounted accumulator members positioned adjacent one another;

(b) an input drive mechanism arranged to impart rotational drive to a first of the accumulator members; and (c) velocity responsive coupling members arranged to provide for magnetic coupling of successive ones of the accumulator members when respective ones of the accumulator members are caused successively to rotate with an angular velocity equal to, or greater than, a predetermined velocity.

In operation of the above defined accumulator, as rotational drive is imparted (for example, incrementally) to the first of the accumulator members, the first accumulator member is caused to rotate and its angular velocity increases progressively to the predetermined level. Having reached the predetermined level of angular velocity, magnetic coupling is established between the first accumulator member and the next succeeding (adjacent) accumulator member, whereby it is caused to rotate and its angular velocity is increased progressively to the predetermined level. When a steady state condition is reached and both (or if more than two, all) of the accumulator members are rotating with the predetermined angular velocity, kinetic energy (in the form of rotational drive) may be transferred to a load from the accumulator for such time as kinetic energy is imparted to the first accumulator member. Thus, the accumulator can be employed to facilitate the coupling of a low inertia energy source or transmitter to a load having a relatively high moment of inertia. Moreover, the rotational drive can continue to be applied to the load by the accumulator for a period of time in the absence of kinetic energy being imparted to the accumulator due to the momentum of the rotating accumulator members.

Hence, in another aspect of the invention there is provided a kinetic energy transfer system, comprising:

(a) an energy accumulator comprising a plurality of rotatably mounted accumulator members positioned adjacent one another, an input drive mechanism arranged to impart rotational drive to a first of the accumulator members, and velocity responsive coupling members arranged to provide for magnetic coupling of successive ones of the accumulator members when respective ones of the accumulator members are caused successively to rotate with an angular velocity equal to, or greater than, a predetermined velocity;

(b) an energy transmitter mechanism arranged to apply drive from a kinetic energy source to the input drive mechanism of the energy accumulator; and (c) a load device coupled to, and arranged to be driven by, the energy accumulator when each of the accumulator members is rotating with an angular velocity equal to, or greater than, the predetermined velocity.

The energy accumulator can comprise as many accumulator members as required (for any given application) to match a load to the source of kinetic energy. It may comprise as few as two accumulator members, in which case at least one velocity responsive coupling member can be mounted to one of the accumulator members. However, the energy accumulator desirably comprises n accumulator members (where n≥3), in which case the velocity responsive coupling members will desirably be mounted to (n−1) of the accumulator members.

The accumulator members can optionally be mounted for rotation about respective axes but desirably are mounted for rotation about a common axis. In at least some embodiments, the accumulator members are bearing mounted to a common fixed axle.

The accumulator members can have any configuration, including a polygonal periphery, but they desirably have a circular disc-shaped configuration. Also, the accumulator elements may each be formed to exhibit substantially the same moment of inertia (with respect to their axis of rotation) or they may be formed (from the first to the $n^{th}$) to exhibit successively increasing moments of inertia.

The accumulator input drive mechanism will optionally be determined by the source of drive to be input to the accumulator but will desirably include a unidirectional clutch device.

The velocity responsive coupling members can comprise any devices or mechanisms that function to provide for magnetic coupling of one accumulator member to another as each of the accumulator members is caused to rotate with an angular velocity equal to a predetermined velocity. However, each coupling member is desirably arranged to move into its functional position under the influence of centrifugal force responsive to rotation of its associated accumulator member at an angular velocity equal to the predetermined velocity. In this latter case, each coupling member may optionally be mounted to its associated accumulator member for linear movement or, most desirably, be mounted for pivotal movement.

The magnetic coupling of one accumulator member to another can optionally be achieved in various ways. For example, a permanent magnet can be mounted to each of the coupling members and the accumulator members may be formed at least in part from a magnetically attracted (e.g., ferromagnetic) material. Alternatively, permanent magnets can be mounted to the accumulator members and the coupling members can be formed at least in part from a magnetically attracted material. As a further alternative, permanent magnets may be mounted to both the coupling members and the accumulator members with a polarity relationship arranged to permit magnetic coupling (in either an attractive or repulsive sense) between the coupling and accumulator members.

The permanent magnets desirably comprise rare earth magnets. The magnetic coupling facilitates slippage and, consequentially, smooth dynamic coupling between adjacent ones of the accumulator members.

A secondary magnet system can be employed for biasing the coupling members in a manner to sever magnetic coupling of adjacent accumulator members when the angular velocity of a given accumulator member falls below that of the predetermined velocity.

The drive mechanism can comprise any suitable such mechanism for providing rotational drive to the kinetic energy accumulator.

In particular, in another aspect of the invention there is provided a drive mechanism for applying rotational drive to a load device, comprising:

(a) first and second drive means, the second drive means being arranged to drive rotation of the load device;
(b) a unidirectional clutch; and
(c) a drive system for being driven by the energy transmitter and including a first element for driving rotation of the first drive means and a second element for driving the rotation of the second drive means, wherein the second element is arranged to be rotatably driven by, and is rotatable relative to, the first element, the first element and the first drive means have a higher drive ratio compared to the second element and the second drive means, and the first drive means is arranged to drive the rotation of the second drive means via the unidirectional clutch.

The drive system can include a further unidirectional clutch disposed between the first and second elements, wherein the first element is arranged to drive rotation of the second element via the further clutch.

In at least some embodiments the drive system can also comprise:

a drive band looped around the first element and the first drive means for effecting the rotation of the first drive means;

damper means arranged to maintain tension on the drive band and pivot about an axis of rotation of the first drive means from an initial position to an end position upon the drive band being driven by the first element, the pivoting of the damper means to the final position damping rotational drive applied to the first drive means by the drive band; and return means for biasing the damper means into the initial position and returning the damper means about the pivot axis from the end position to the initial position in the absence of the drive band being driven by the first element, the damper means being adapted to pivot back and forth between the initial and end positions at least until the second element has attained an initial angular velocity.

The damper means can comprise a pair of tensioning arms pivotable about the axis of rotation of the first drive means relative to one another, wherein one of the arms presses against one side of drive band and the other of the arms presses against an opposing side of the drive band, and the arms are biased away from each other.

The return means can comprise permanent magnets at least one of which is mounted on a first of the arms of the damper means so as to be pivotable about the pivot axis with the first said arm, and another of which is mounted in a fixed position separate from the first arm, wherein the magnet on the first of the arms and the magnet in the fixed position are in oppositely poled orientation to attract each other.

Moreover, the arms of the damper means can be biased away from each other by permanent magnets arranged on the arms in opposite i.e., (repulsively poled) orientation to repel each other. Alternatively, a spring arrangement can for instance be employed to bias the arms of the damper means away from each other.

Typically, the first and second elements are pulleys rotatable about a common axis of rotation, and the first and second drive means are further pulleys having a different common axis of rotation. Generally also, the first and second pulleys are sized the same.

However, as will be understood, gears or other drive elements can be employed as the first and second elements and the first and second drive means, or for example, a combination of gears and pulleys or other suitable such drive elements. The pulleys for instance can be toothed or splined pulleys. The drive band can be a drive belt when pulleys are used or a drive chain when gears and/or toothed pulleys are employed.

The energy transmitter of a kinetic energy transfer system embodied by the invention desirably comprises one that functions to convert linear motion of a kinetic energy source to rotary motion. The linear motion may be in a generally horizontal direction, such as derived from the forward motion of a moving road vehicle, or in a generally vertical direction. Kinetic energy from the source may optionally be delivered by the accumulator to any form of load, including a rotary pump, but desirably is delivered to an electrical generator. A clutch mechanism, including one that embodies the operating principles of the accumulator, may optionally be interposed between the accumulator and the load.

Hence, in another aspect of the invention there is provided an energy transmitter for converting motion of a kinetic energy source to rotational drive, comprising:

an actuator for being driven in a substantially linear direction from a neutral position to a displaced position by the kinetic energy source;

at least one pair of radial arms spaced apart from one another and being rotatably connected at a distal end of the arms to the actuator, an opposite proximal end of each radial arm being rotatably mounted, and at least one of the arms being arranged to rotate a drive shaft about its respective axis of rotation to provide the rotational drive upon the actuator being driven in the linear direction by the kinetic energy source; and an arrangement of magnets with magnets in the arrangement being positioned in repulsively poled orientation for returning the actuator from the displaced position to the neutral position.

The energy transmitter can further comprise a support disposed between the radial arms and carrying a plurality of the magnets, wherein further of the magnets are mounted on the radial arms, the magnets on the support being arranged to repulse the magnets on the radial arms.

As will also be understood, respective of the magnets of the energy transmitter can be permanent magnets such as permanent rare earth magnets although again, any suitable permanent magnets can be employed.

By "drive ratio" in the context of the invention with respect to the first drive element and the first drive means of a drive mechanism embodied by the invention is meant the ratio of the speed of rotation of the first element to that of the first drive means. Similarly, the "drive ratio" of the second element to the second drive means is the ratio of the speed of rotation of the first element to that the second drive means.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The invention will be more fully understood from the following drawing-related description of illustrative embodiments of a kinetic energy transfer system and an energy accumulator that is incorporated in the system.

BRIEF DESCRIPTION OF THE ACCOMPANYING DRAWINGS

FIG. 17 is a diagrammatic plan view of a kinetic energy transfer system embodied by the invention;

FIG. 18 is a diagrammatic end view of the kinetic energy transfer system of FIG. 17;

FIG. 20 is a schematic plan view of the energy transmitter component of FIG. 19.

DETAILED DESCRIPTION OF EXEMPLARY EMBODIMENTS OF THE INVENTION

Figure 1:
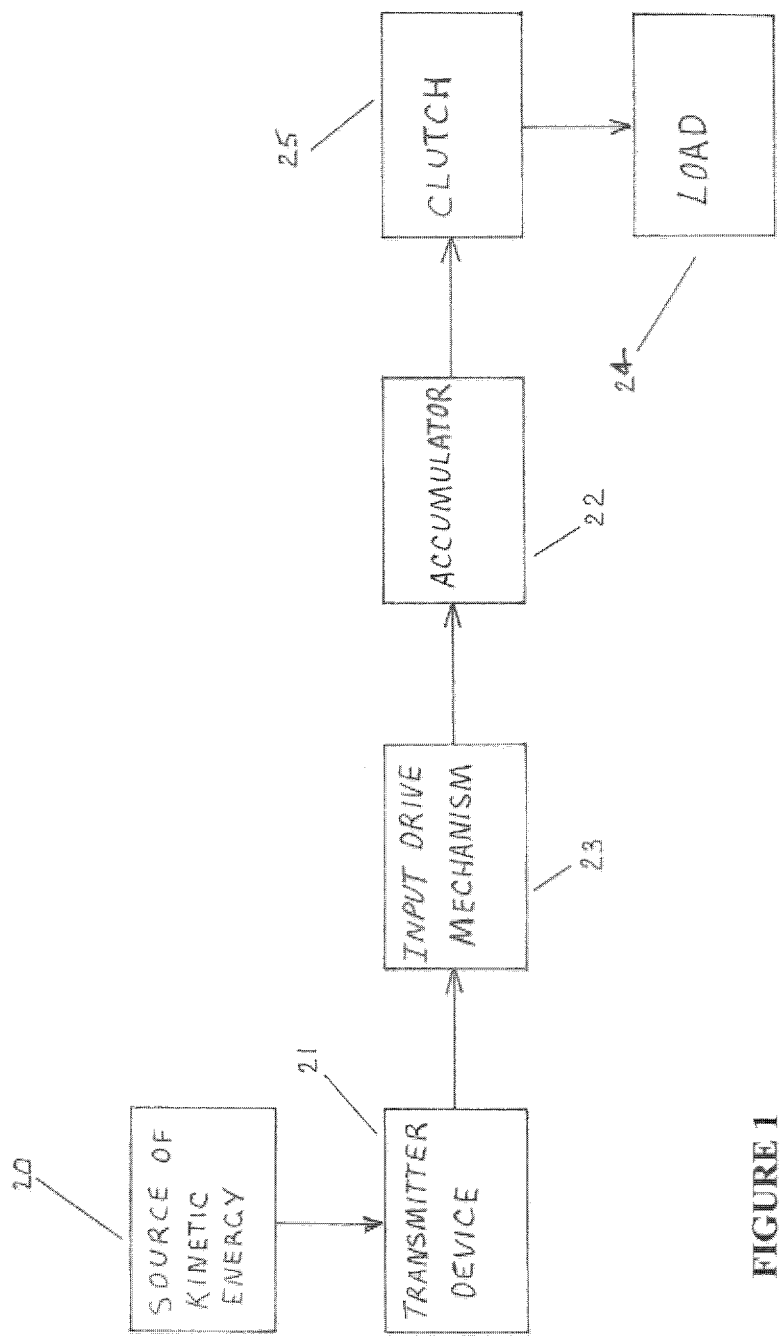
FIG. 1 shows a schematic representation of the complete energy transfer system.

As illustrated in FIG. 1, the energy transfer system comprises a source 20 of kinetic energy which, in operation of the system, delivers kinetic energy to an energy transmitter 21. The source 20 will typically comprise a succession of moving vehicles which, in engaging with the transmitter 21, does work on, by imparting movement to, the transmitter 21. However, as indicated previously, the energy source might alternatively comprise any moving object that has the capacity to impart movement to the transmitter 21.

Energy input to the transmitter 21 is transmitted in the form of incremental mechanical movement to an accumulator 22 by way of an input drive mechanism 23. When sufficient kinetic energy is accumulated in the accumulator 22 to overcome the static inertia of a load 24, drive is delivered to the load from the accumulator (by way of a clutch 25, e.g., a centrifugal clutch) for such time as energy is input incrementally to the accumulator from the source 20.

The load 24 will typically comprise an electrical generator, but it might equally comprise a fluid pump or any other type of machine to which rotary or reciprocating drive is to be applied.

The transmitter device 21 is illustrated diagrammatically in FIG. 2 as being located within a recess 26 below a roadway 27 and it comprises an actuator plate 28 which is arranged to be driven in a substantially linear direction by forward movement of a vehicle (not shown) passing over and engaging with the actuator plate. The actuator plate 28 is biased into a neutral position (shown in FIG. 2) by two pairs of rare earth permanent magnets 29 and 30, with the magnets of each pair being positioned in opposing (i.e., repulsively poled) orientation.

The actuator plate 28, as shown, is carried by two radial arms 31 and 32, both of which are caused to turn (for example in a clockwise direction) when the actuator plate 28 is moved substantially linearly forward by a forwardly moving vehicle, and both of which are returned to the neutral position by the pairs of magnets 29 and 30 following passing of the vehicle. The radial arm 31 is carried by an idler shaft 33, and the radial arm 32 is connected to a drive shaft 34 which is caused to turn with linear movement of the actuator plate 28. In a possible alternative arrangement (not shown), the radial arm 31 and the idler shaft 33 may be omitted and the actuator plate 28 may be directly connected to the drive shaft 34 by the radial arm 32.

Incremental turning movement of the drive shaft 34 is transmitted to the accumulator 22 by the input drive mechanism 23, one embodiment of which is to be described later with reference to FIGS. 8 to 10.

Figure 3:
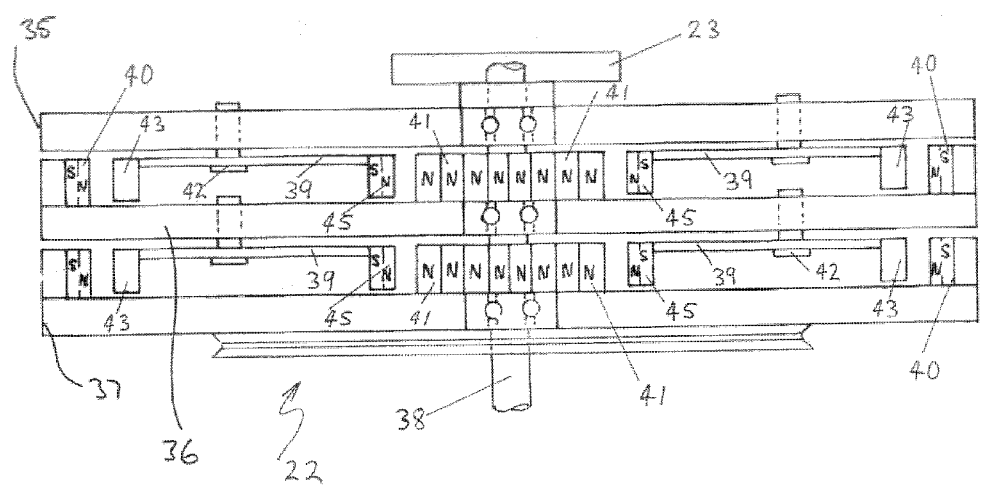
FIG. 3 shows a diagrammatic elevation view of a first type of energy accumulator that is incorporated in the system.
Figure 4:
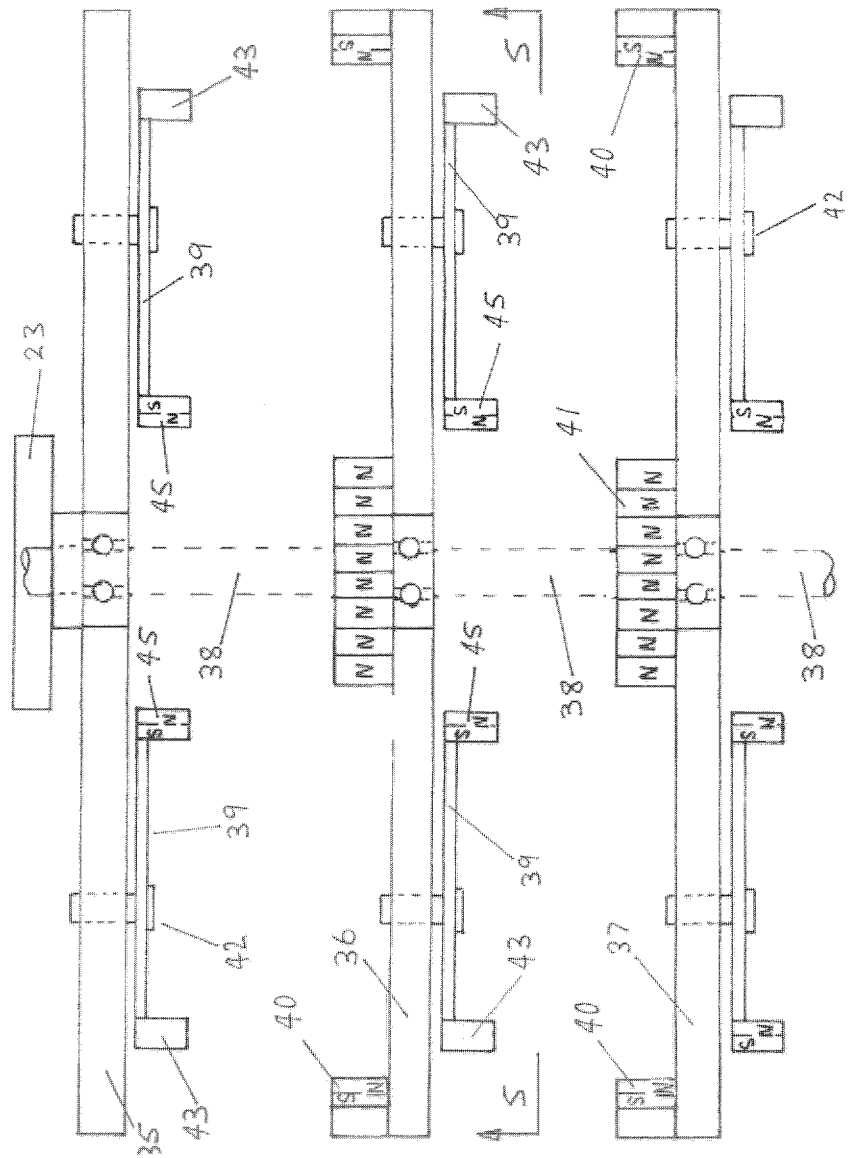
FIG. 4 shows an exploded elevation view of the accumulator shown in FIG. 3.
Figure 5:
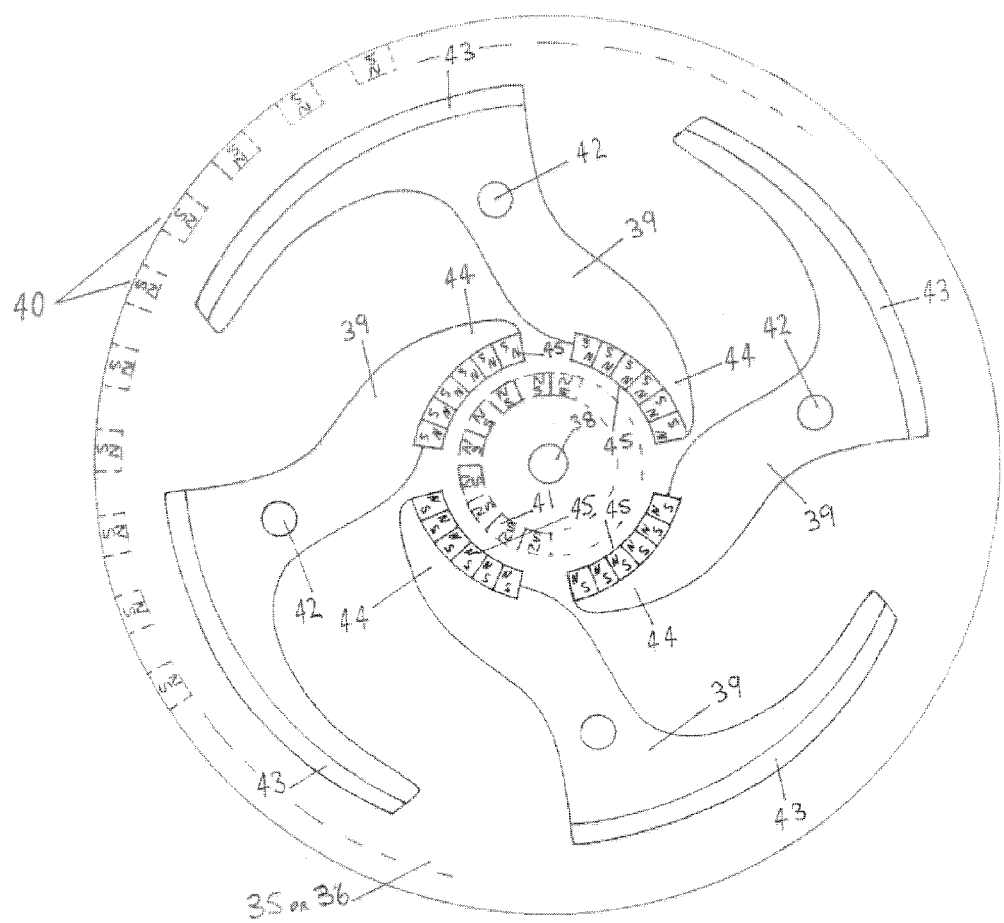
FIG. 5 is an underside plan view of an accumulator member as seen in the direction of section plane 5-5 shown in FIG. 4.

The accumulator 22 as illustrated diagrammatically in FIGS. 3 to 5 comprises three accumulator members 35, 36 and 37, each of which has a generally disc-shaped configuration, is formed from a non-magnetic material and effectively functions as a flywheel. The accumulator members are mounted for independent rotation about a common fixed axle 38 and, thus, are independently rotatable about a common axis. The first and second accumulator members 35 and 36 both carry at least one and desirably, as illustrated, four pivotal velocity responsive coupling members 39. That is, embodiments can be provided with a lesser (e.g., three) or greater number of coupling members. In the embodiment shown, each of the second and third accumulator members 36 and 37 is provided around its periphery with an external ring of rare earth permanent magnets 40, typically (but not necessarily) arranged with alternating (N-S-N-S---) magnetic poles. Also, each of the second and third accumulator members 36 and 37 is provided with an internal ring of commonly (N-N-N--- or S-S-S---) poled rare earth permanent magnets 41.

As best seen from FIG. 5, each of the coupling members 39 is generally L-shaped and they are pivotally mounted to their respective accumulator members 35 and 36 by pivot pins 42. Each coupling member 39 is formed predominantly from a non-magnetic material but is provided with an outer, generally arcuate ferromagnetic foot 43. The radially inner end 44 of each of the coupling members is provided with an arcuate array of permanent magnets 45 which are commonly poled (N-N-N--- or S-S-S---) to be repelled by the internal ring of magnets 41 on respective (successive) ones of the accumulator members 36 and 37.

With the accumulator 22 in a static condition, the (repulsive) magnetic field strength exerted between the internal magnet ring 41 and the arcuate magnet array 45 is predetermined to maintain the coupling members 39 in a neutral position; that is with the ferromagnetic feet 43 of the coupling members 39 effectively decoupled from the magnetic fields linking the magnets in the external rings 40 of magnets on respective (successive) ones of the accumulator members 36 and 37. However, the coupling members 39 are each weighted such that, when the accumulator members 35 and 36 are caused to rotate with a predetermined angular velocity, the coupling members 39 are subjected to a centrifugal force that is sufficient to overcome the magnetic repulsion between the internal magnet ring 41 and the arcuate magnet array 45 and to cause the radially outer portion of each coupling member to pivot outwardly. As this occurs, the coupling members 39 are moved from their neutral position to a functional position and magnetic coupling is established between the ferromagnetic feet 43 of the coupling members 39 and the external rings 40 of magnets on respective (successive) ones of the accumulator members 36 and 37.

That is, in operation of the accumulator 22 as described thus far, as rotational drive is imparted incrementally to the first accumulator member 35 from the transmitter device 21, the first accumulator member 35 is caused to rotate and its angular velocity increases progressively to the predetermined level. Having reached the predetermined level of angular velocity, the coupling members 39 that are mounted to the first accumulator member 35 pivot outwardly under the influence of centrifugal force and magnetic coupling is established between the first and second accumulator members 35 and 36 by way of the coupling members 39 and the external ring 40 of magnets on the second accumulator member 36. The second accumulator member 36 is thereby caused to rotate and its angular velocity is increased progressively to the predetermined level, whereupon magnetic coupling is established with and rotational drive is imparted to the third accumulator member 37. When a steady state condition is reached and all three of the accumulator members are rotating with an angular velocity equal to or greater than the predetermined angular velocity, (rotational) kinetic energy may be transferred from the accumulator 22 to the load 24. Thus, the accumulator can be employed to facilitate the coupling of a low inertia energy transmitter (i.e., the actuator plate 28) to a load 24, such as an electrical generator, having a relatively high moment of inertia. Moreover, in the event kinetic energy ceases to be delivered to the kinetic energy transmitter 21 and thereby the accumulator 22, the accumulator members will continue to rotate for a period due to their rotational momentum. Thus, rotational drive will continue to be delivered to the load by the accumulator until the angular velocity of the accumulator members falls below that required for driving the load.

If the application of the kinetic energy only ceases temporarily (such as arising from a lull in vehicle traffic), the reapplication of kinetic energy to the kinetic energy transmitter will resume the driving of the (rotating or stationary) accumulator members.

Figure 6:
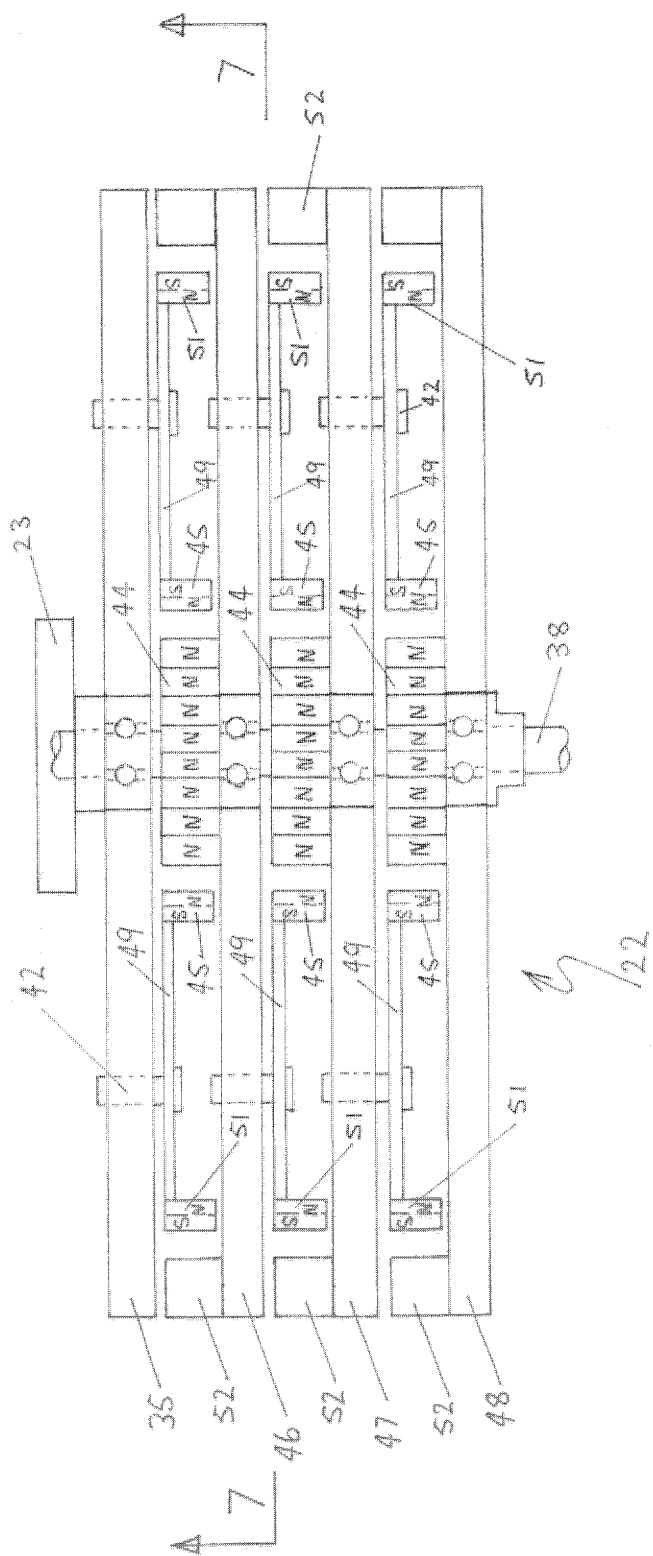
FIG. 6 shows a diagrammatic elevation view of an alternative type of energy accumulator for incorporation of the system shown in FIG. 1.
Figure 7:
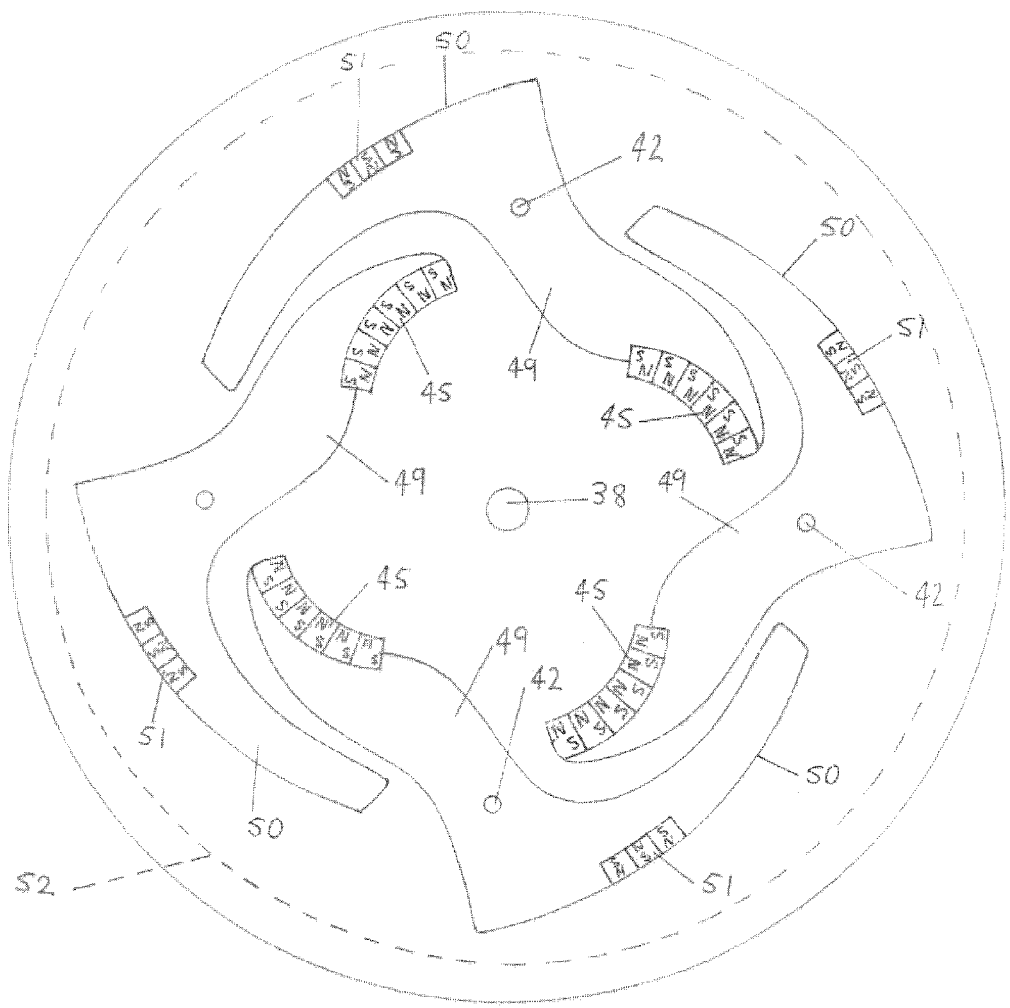
FIG. 7 is an underside diagrammatic plan view of an accumulator member as seen in the direction of section plane 7-7 shown in FIG. 6.

The accumulator 22 as illustrated in FIGS. 6 and 7 is similar to that as above described and like reference numerals are employed to identify like components. However, the accumulator as illustrated in FIGS. 6 and 7 has four disc-shaped accumulator members 35, 46, 47 and 48 that are formed substantially from a non-magnetic material. The first, second and third accumulator members 35, 46 and 47 each carry four pivotal velocity responsive coupling members 49 and, in contrast with the coupling members 39, each of the coupling member 49 has an outer, generally arcuate foot 50 which is formed at least in part by a series of alternatingly poled permanent rare earth magnets 51. Also, the second, third and fourth accumulator members 46, 47 and 48 are formed with a circumferential ring 52 of magnetically attracted material (e.g., ferromagnetic material such as steel).

The operation of the accumulator as shown in FIGS. 6 and 7 is substantially the same as that of FIGS. 3 to 5, except that magnetic coupling is established between the accumulator members by way of the magnets 51 at the outer periphery of the coupling members 49 and the ferromagnetic ring 52 on the second to fourth accumulator members 46 to 48.

Incremental rotary drive is applied to the first accumulator member 35 (of both forms of the accumulator 22) by way of the input drive mechanism 23. This mechanism comprises a motion translating mechanism 53, as shown in sequential stages of operation in FIGS. 8 to 10, and a unidirectional clutch (e.g., a cam clutch or a Sprag clutch, not shown) that connects the motion translating mechanism to the first accumulator member 35.

The motion translating mechanism 53 comprises a lever arm 54 (FIGS. 8 to 10) that forms a radial extension of the drive shaft 34 of the transmitter device 21. The outer end of the lever arm 54 is pivotally connected to a shorter limb of an L-shaped pivotal lever 55 by way of a link 56, and the outer end of a longer limb of the lever 55 is provided with a roller 57 which acts on the shorter arm of a further pivotal lever 58 by engaging in an arcuate first roller race 59. The pivotal lever 58 pivots about a pivot pin 60 and is provided at the end of its longer arm 61 with a roller 62 that acts on a driven arm 63 by engaging in an arcuate second roller race 64.

Figure 8:
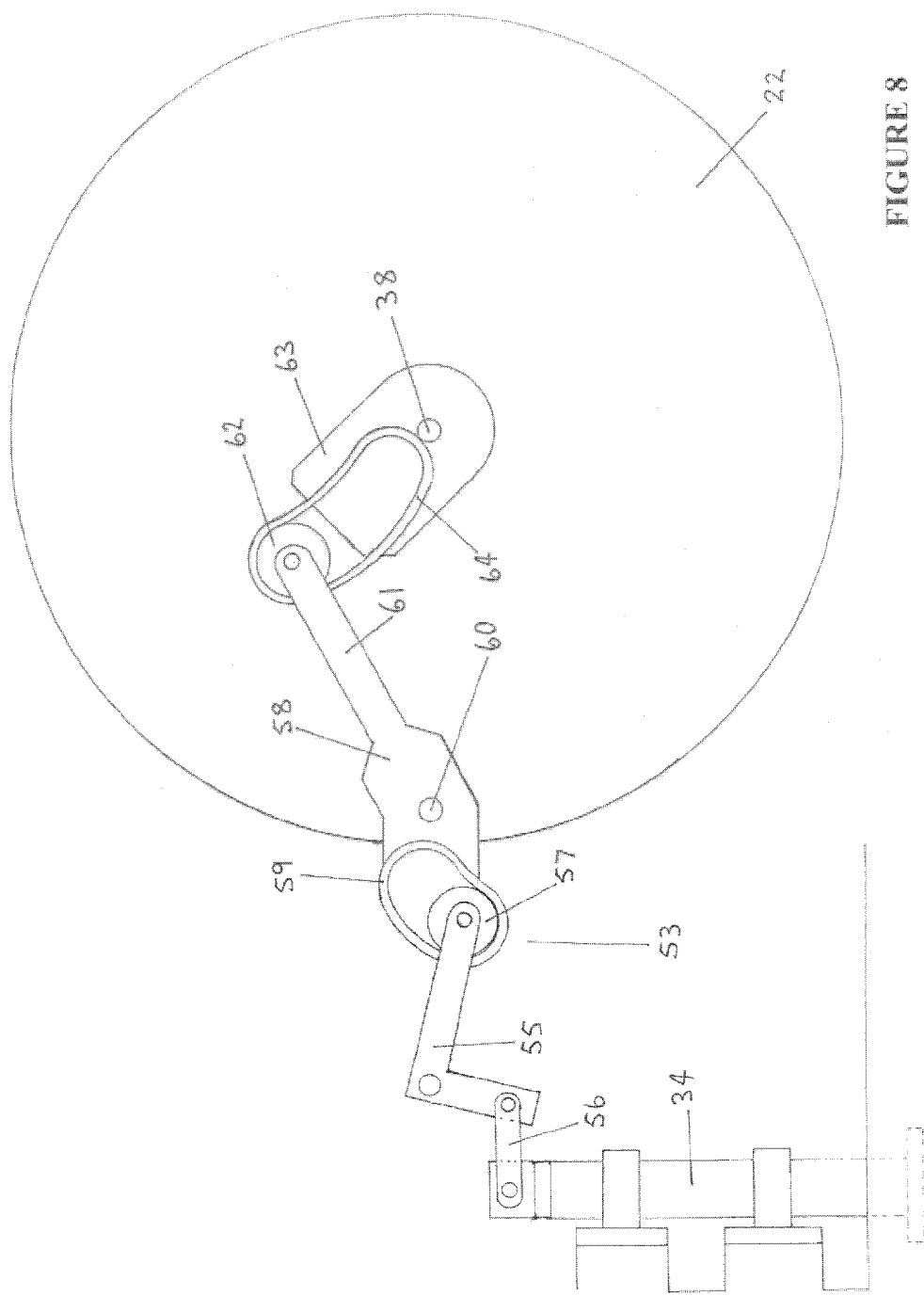
FIG. 8 is a diagrammatic representation of an input drive mechanism that is arranged to impart incremental rotational drive to the accumulator from the energy transmitter, the drive mechanism being shown in an initial position of an operating stroke.
Figure 9:
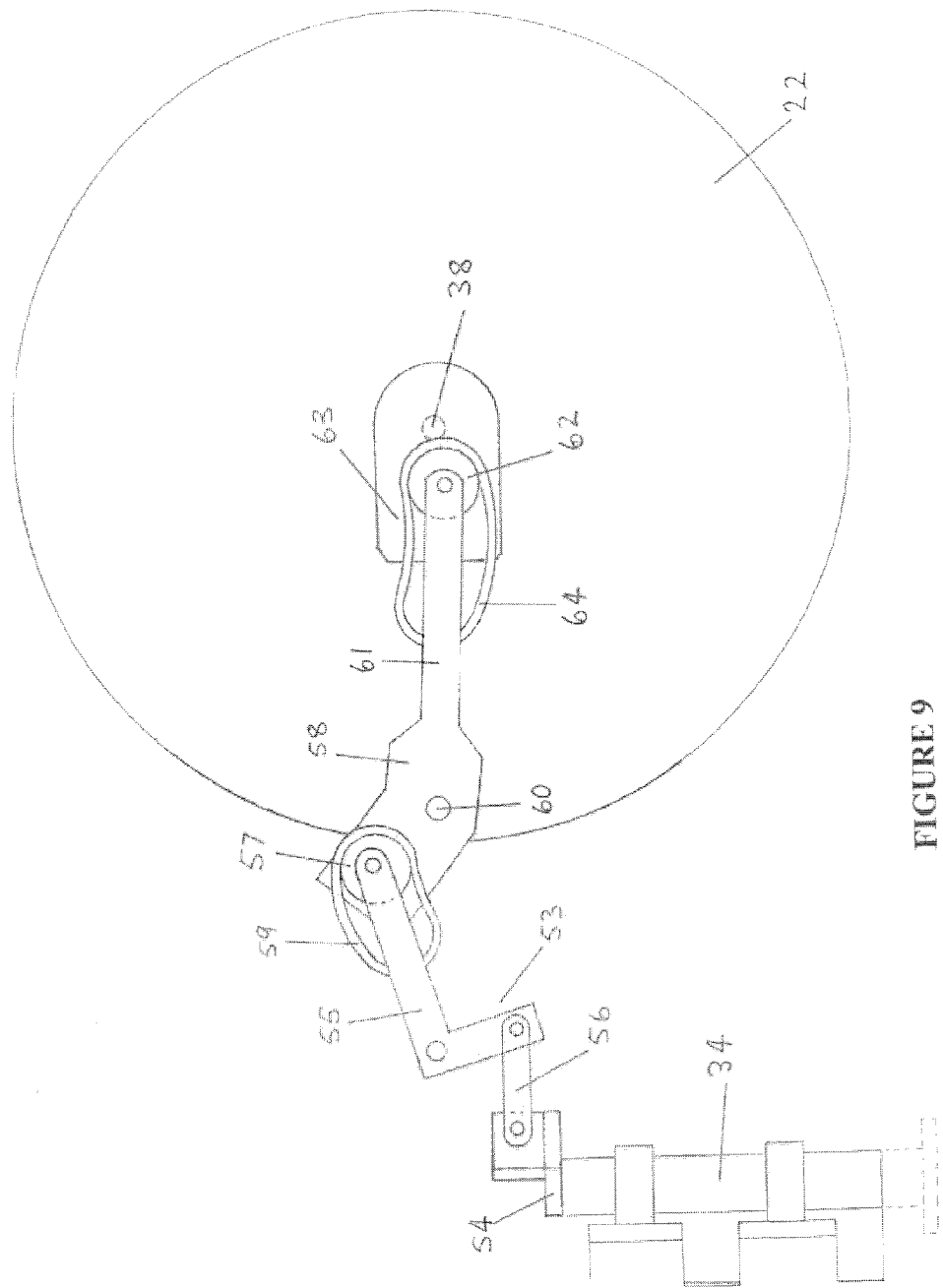
FIG. 9 shows the drive mechanism of FIG. 8 in an intermediate operating stroke position.
Figure 10:
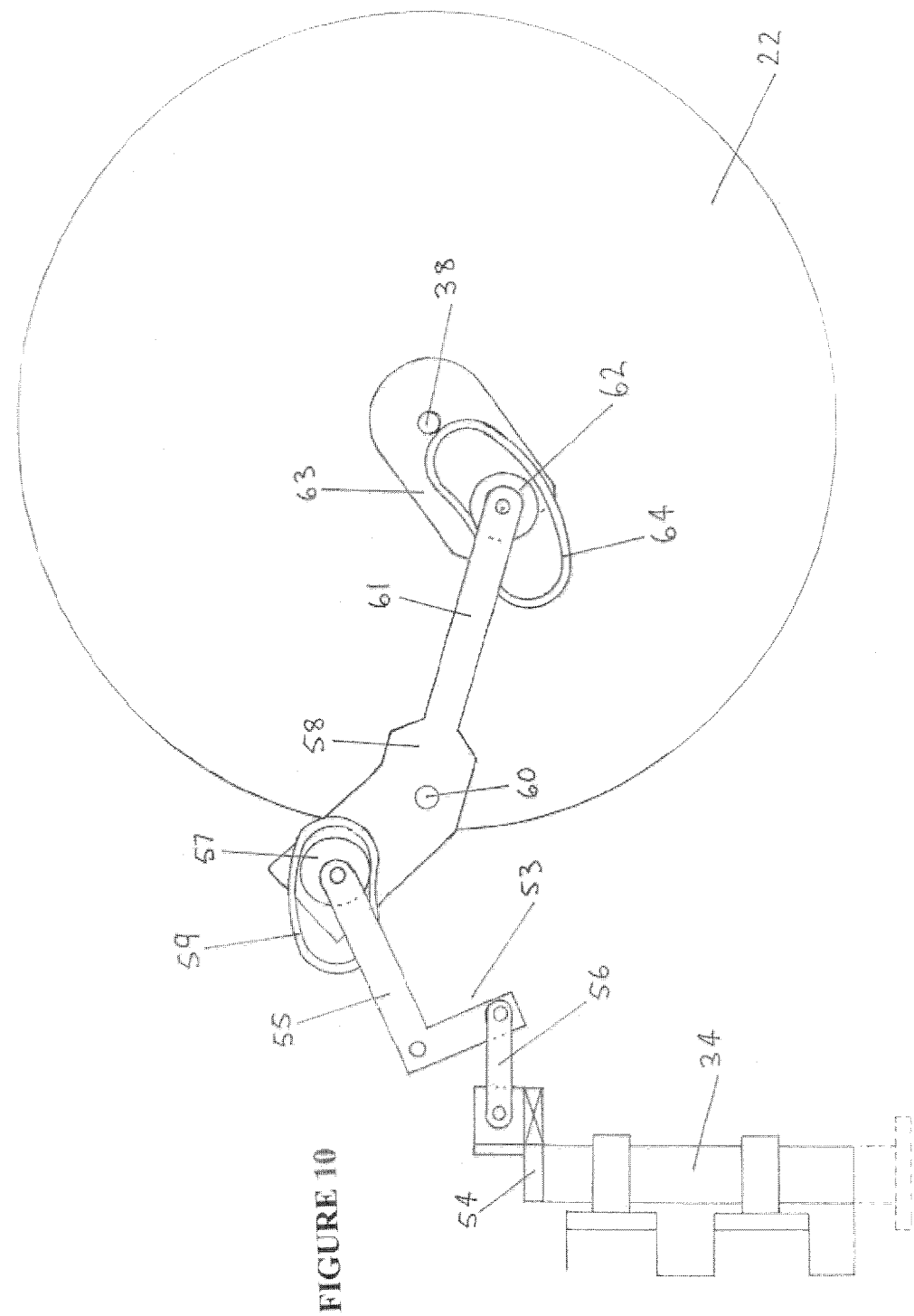
FIG. 10 shows the drive mechanism of FIG. 8 in an operating stroke end position.

With initial turning movement of the drive shaft 34, the pivotal lever 55 is caused to turn from its starting position as shown in FIG. 8 to the intermediate position shown in FIG. 9. This causes the roller 57 to move through the race 59 and, as a consequence, to effect turning of both the pivotal lever 58 and the driven arm 63, the latter as a consequence of movement of the roller 62 in the race 64. Continued movement of the drive shaft 34 to the position shown in FIG. 10 results in further turning of the levers 55 and 58 and turning of the driven arm 63 to its end position as shown in FIG. 10. Thus, the motion translating mechanism 53 functions to amplify a small amount of rotation (say 15° to 20°) at the drive shaft 34 to approximately 60° to 80° of incremental rotation of the driven arm 63 and, hence, of the first accumulator member 35. Moreover, by utilising the roller-in-race arrangements the turning moment on the levers 55 and 58 is maximised at the commencement of each actuation and angular velocity imparted to the first accumulator member 35 is optimised.

Thus, in another aspect of the invention there is provided a drive mechanism for providing rotational drive to a load, comprising rotational drive means for being rotated back and forth about its axis of rotation, a unidirectional clutch, and first and second rollers. A first lever is coupled at one end to the rotational drive means, and the first roller is rotatably mounted on an opposite end of the lever, the lever being pivotally mounted to pivot about a pivot axis with rotation of the rotational drive means. A second lever with an arcuate first roller race at one end is also provided. The second roller is rotatably mounted on an opposite end of the second lever and the first roller is disposed in the roller race, wherein the second lever is pivotally mounted to pivot about a further pivot axis upon the first roller being driven along the first roller race by the first lever. The drive mechanism also includes a drive arm with an arcuate second roller race receiving the second roller and being pivotally mounted to pivot about an axis of rotation in an opposite direction to the second lever upon the second roller being driven along the second roller race by the second lever, wherein the drive arm is arranged to apply the rotational drive to the load via the unidirectional clutch with the rotation of the drive arm about its axis of rotation in the opposite direction. As in the embodiment shown in FIGS. 8 to 10, the second lever (e.g., pivotal lever 58) and second roller race (e.g., roller race 64) will typically be dimensioned to rotate the drive arm to a greater degree than the degree of rotation of the first lever (e.g., lever 55) by the rotational drive means (e.g., draft shaft 34).

Figure 11:
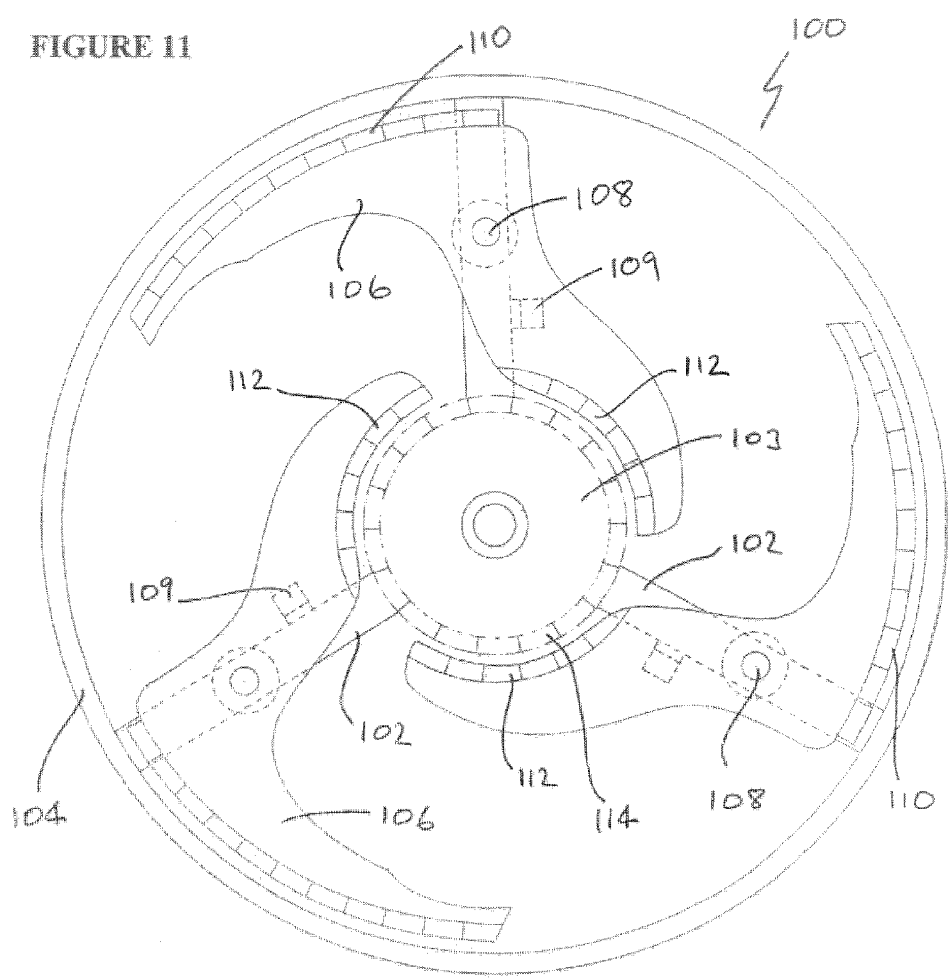
FIG. 11 is an underside diagrammatic plan view of a further accumulator member embodied by the invention.

An underside view of a further embodiment of an accumulator member 100 is shown in FIG. 11. This accumulator member is in the form of a hubbed wheel, with a number of radially directed spokes 102 connecting a central hub 103 to an outer peripheral ring 104 of ferromagnetic material. The outer ring 104 projects upwardly from the spokes. In the embodiment shown, the outer ring is fabricated from steel. While three spokes 102 are shown, accumulator members of this type will typically have nine or more such spokes.

As can be seen, the velocity responsive coupling members 106 are pivotally mounted via pivot pins 108 to respective of the spokes 102. A radially outer end of each coupling member 106 is provided with an array of permanent rare earth magnets 110 arranged to magnetically couple with the outer peripheral ferromagnetic ring of an adjacent (successive) accumulator member in use. The opposite inner end of each coupling member 106 is provided with a further array of permanent rare earth magnets 112 which are commonly poled (N-N-N--- or S-S-S---) to be repelled by the inner ring of permanent rare earth magnets 114 of a successive accumulator member 100 (indicated in phantom outline in FIG. 11) as better illustrated in FIG. 16. The coupling members 106 of the accumulator member 100 are shown in FIG. 11 in their functional positions. That is, positions in which the coupling members have pivoted about pivot pins 108 in response to centrifugal force exerted on the coupling members with rotation of the accumulator member 100 in use.

A stopper 109 (also shown in phantom outline) is mounted on an upper side of each of the coupling members 106 for contact with the corresponding spoke 102 to preventing over rotation of the respective coupling member about its pivot pin into contact with the outer peripheral ring 104 of ferromagnetic material. Each stopper comprises a bracket extending perpendicularly to the plane in which the coupling members lie, and a stopper pin. The stopper pin is disposed at a right angle to the bracket for contact with the spoke and projects a distance from the bracket to minimise the gap between the radially outer peripheral array of magnets 110 of the coupling member and the outer peripheral ring 104 of ferromagnetic material, thereby optimising the efficiency of the magnetic coupling between the magnets 110 and peripheral ring 104.

A further input drive mechanism 116 embodied by the invention is shown in FIG. 12 to FIG. 18. More particularly, the kinetic energy accumulator 118 is mounted in an outer metal frame 120. A drive shaft 122 is bearing mounted at 124 to the frame 120 and is connected at an input end of the shaft to an energy transmitter mechanism 202 further described below in relation to FIG. 17 to FIG. 20. A pivot arm 128 is connected to a unidirectional clutch device 130 mounted on a further drive shaft 132 by a link 134. The drive shaft 132 is in turn bearing mounted at each end to the frame 120 (see FIG. 14). With back and forth rotation of the drive shaft 122 about its axis, the pivot arm 128 pivots back and forth driving incremental rotation of the further drive shaft 132 in an anti-clockwise direction. A drive pulley 136 is mounted on a lower end of the further drive shaft 132 and when rotated in the anti-clockwise direction drives the rotation of rotation transfer pulley 138 via drive belt 140. The transfer pulley 138 is mounted on a lower end of another drive shaft 142 which is also bearing mounted at each end to the frame 120.

Figure 14:
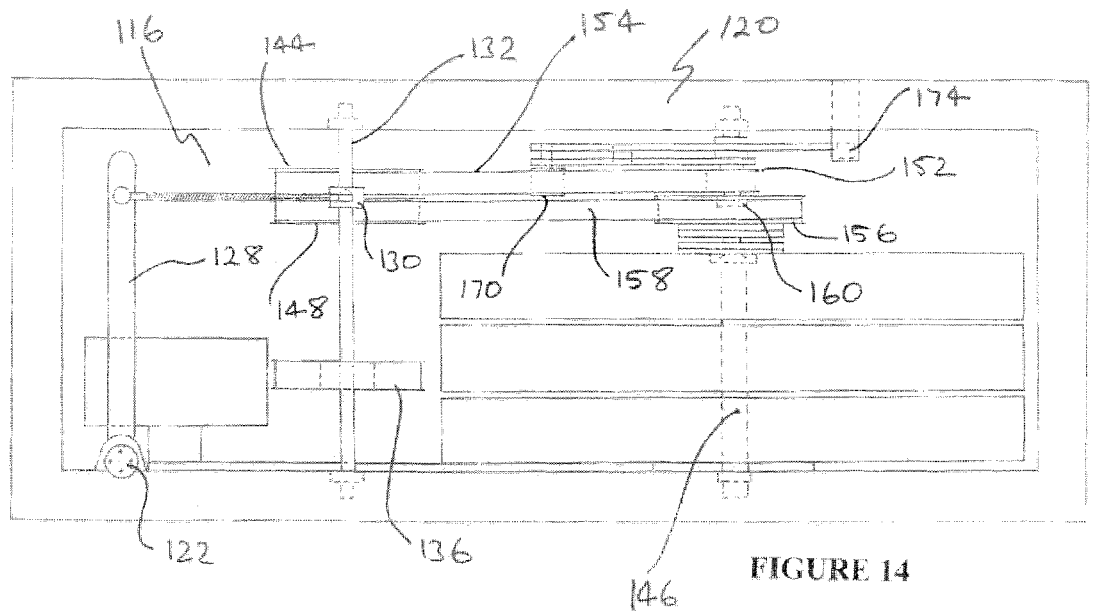
FIG. 14 is a diagrammatic side view of a kinetic energy transfer system embodied by the invention incorporating the input drive mechanism shown in FIG. 12.
Figure 15:
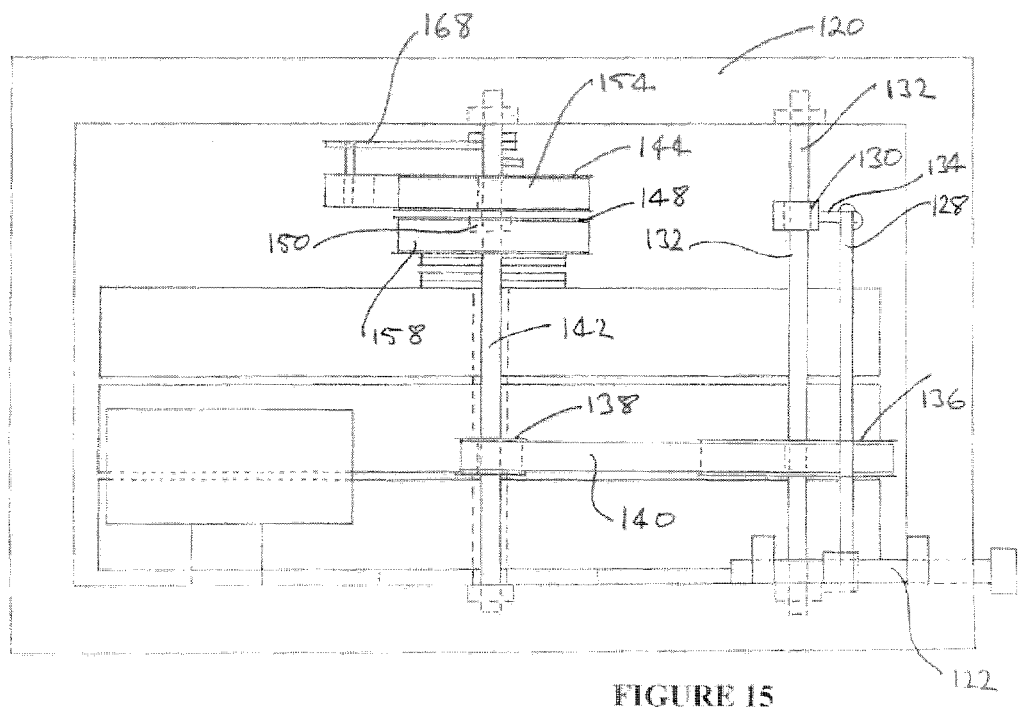
FIG. 15 is a diagrammatic end view of the kinetic energy transfer system of FIG. 14.

A first element in the form of a drive pulley 144 is mounted on the drive shaft 142 at an upper end thereof, and is arranged to drive rotation of a second drive element in the form of a second drive pulley 148 via a unidirectional clutch 150 (see FIG. 15). The second drive pulley 148 can "free wheel" that is, rotate independently of the first drive pulley 144, in the anti-clockwise direction. As best shown in FIG. 14, the first drive pulley 144 is arranged to rotate first drive means in the form of a first slave pulley 152 via an upper drive belt 154. The second drive pulley 148 drives rotation of second drive means in the form of a second slave pulley 156 via a lower drive belt 158. The first slave pulley 152 is coupled to the second slave pulley 156 by a further unidirectional clutch 160, and the second slave pulley can freewheel in the anti-clockwise direction independently of the first slave pulley.

The first and second drive pulleys 144 and 148 are the same size while the first slave pulley is sized to be smaller than both the first drive pulley 144 and the second slave pulley 156. Thus, the first drive pulley 144 and the first slave pulley 152 have a higher drive ratio than the second drive pulley 148 and the second slave pulley 156. That is, the first slave pulley 152 can be driven to a higher angular velocity than the second slave pulley 156 with rotation of the further drive shaft 132.

Returning now to FIG. 12, the input drive mechanism 116 further includes damper means 162 in the form of upper and lower tensioning arms 164 and 166 pivotally mounted to rotate about the fixed axle 146. Idler pulleys 168 and 170 are rotatably mounted to outer radial ends of the tensioning arms 164 and 166, and press against opposing sides of the upper drive belt 154. Biasing means in the form of permanent magnets 172 are mounted on the tensioning arms 164 and 166 in opposite (i.e., repulsively poled) orientation to repel each other (see FIG. 13). That is, the magnetic fields of magnets 172 drive the tensioning arms 164 and 166 apart thereby maintaining tension on the upper drive belt 154. Rather than permanent magnets, a spring arrangement disposed between the tensioning arms could be employed instead.

The input drive mechanism 116 also includes return means comprising a permanent rare earth magnet 173 mounted on an opposite end of the upper tensioning arm 164 and a further permanent rare earth magnet 174 mounted in a fixed position to the metal frame 120 as best shown in FIG. 14. As the magnets 173 and 174 are arranged in oppositely poled orientation to attract each other, they act to bias the tensioning arms 164 and 166 in an initial position, and to return the tensioning arms about the fixed axle to that position in operation of the input drive mechanism 116 as described further below.

More particularly, in use, with intermittent rotation of the drive shaft 132 with the application of rotational drive to the slave transfer pulley 138, rotational drive is applied to the first drive pulley 144. The incremental rotation of the first drive pulley 144 in the anti-clockwise direction drives rotation of the second drive pulley 148 via the unidirectional clutch 150. The rotation of the second drive pulley 148 in turn drives rotation of the second slave pulley 156 causing the first accumulator member 176 of the kinetic energy accumulator 118 to which the second slave pulley is magnetically coupled via a magnetic coupling 178 (see FIG. 16) to start rotating in the anti-clockwise direction.

Rotational drive is also applied to the upper drive belt 154 by the first drive pulley 144 causing the upper tensioning arm 164 to be driven toward the lower tensioning arm 166 against the bias applied by magnets 172 carried on the tensioning arms. As a result, the lower tensioning arm 166 is driven away by the magnetic fields of magnets 172, and both tensioning arms 164 and 166 thereby pivot about the fixed axle 146 from their initial position shown in FIG. 12 to the end position shown in FIG. 13. When the intermittent rotational drive applied by the drive belt 154 ceases, the tensioning arms 164 and 166 pivot back about the fixed axle to the initial position under the action of attracting magnets 173 and 174.

This pivoting of the tensioning arms 164 and 166 back and forth about the fixed axle 146 is repeated with each cycle of intermittent rotational drive applied to the upper drive belt 154 by the first drive pulley 144. This action dampens the rotational drive applied to the first slave pulley 152 by that drive belt, allowing the second slave pulley 156 to gradually increase the angular velocity of the first accumulator member 176 under the action of second drive pulley 148. With the increase in the angular velocity of the second slave pulley 156 (and hence increased angular velocity of the first accumulator member 176), the moment of inertia acting on the first slave pulley 152 reduces facilitating rotation of the first slave pulley by the drive belt 154. As a consequence, the tendency for the tensioning arms 164 and 166 to be driven about the fixed axle 146 with the application of rotational drive to the upper drive belt 154 decreases until the tensioning arms remain in their initial position shown in FIG. 12. With continued application of intermittent rotational drive in the anti-clockwise direction to the drive shaft 132, the first slave pulley 152 is rotated by the first drive pulley 144 to a greater angular velocity than that which can be achieved by the second slave pulley 156 when driven by the second drive pulley 146. At this time, the first slave pulley 144 starts to drive rotation of the second slave pulley 156 via the unidirectional clutch 160 thereby increasing the angular velocity of the first accumulator member 176.

The lower "gearing" provided by the lower drive ratio of the second drive pulley 148 and second slave pulley 156 thereby functions to initiate the rotation of the first accumulator member 176 of the kinetic energy accumulator 118. The higher "gearing" provided by the higher drive ratio of the first drive pulley 144 and first slave pulley 152 then functions to allow the first accumulator member 176 to be driven up to the required angular velocity to permit adjacent accumulator members of the kinetic energy accumulator to be successively magnetically coupled by respective of the velocity responsive coupling members as described above.

Figure 12:
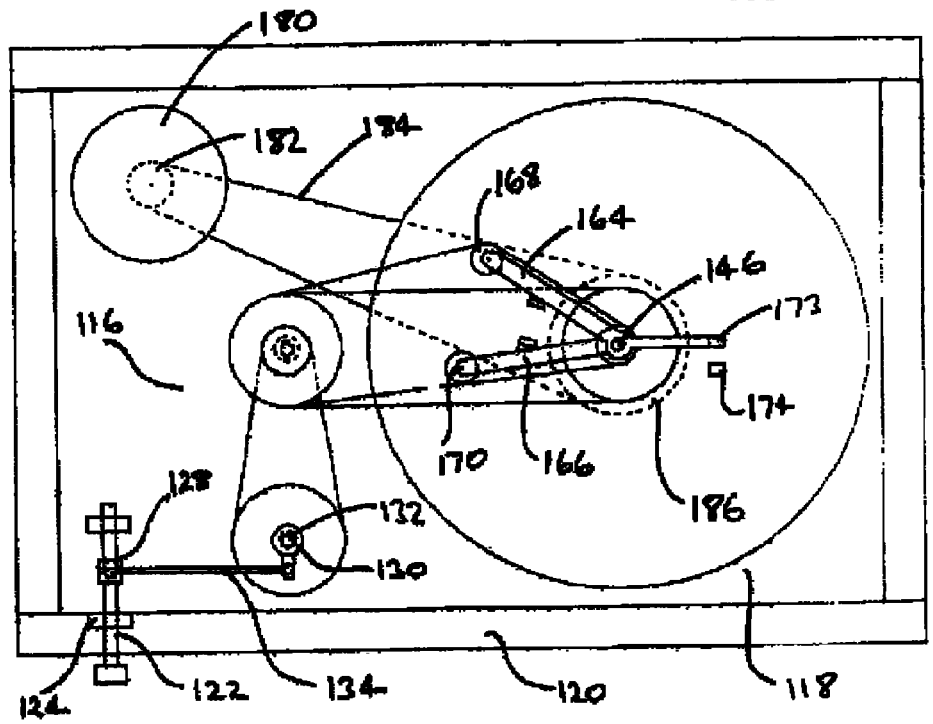
FIG. 12 is a diagrammatic plan view showing a further input drive mechanism for providing rotational drive to a kinetic energy accumulator embodied by the invention.
Figure 13:
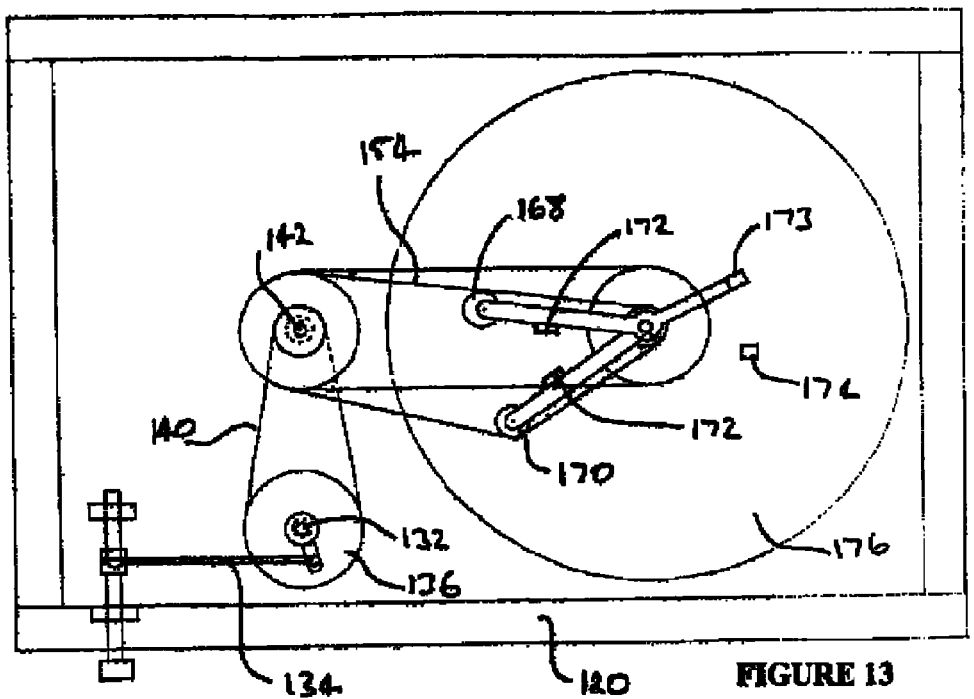
FIG. 13 is a diagrammatic plan view of the input drive mechanism of FIG. 12 in use.

As further illustrated in FIG. 12, once respective of the accumulator members are rotating at, or above, the required predetermined angular velocity, rotational drive from the kinetic energy accumulator 118 can be transmitted to a load device such as an electric generator represented by the numeral 180 via a centrifugal clutch 182 rotated by a further drive belt 184 looped around a drive pulley 186 mounted or otherwise rotatably coupled to the underside of a final one of the accumulator members.

Figure 16:
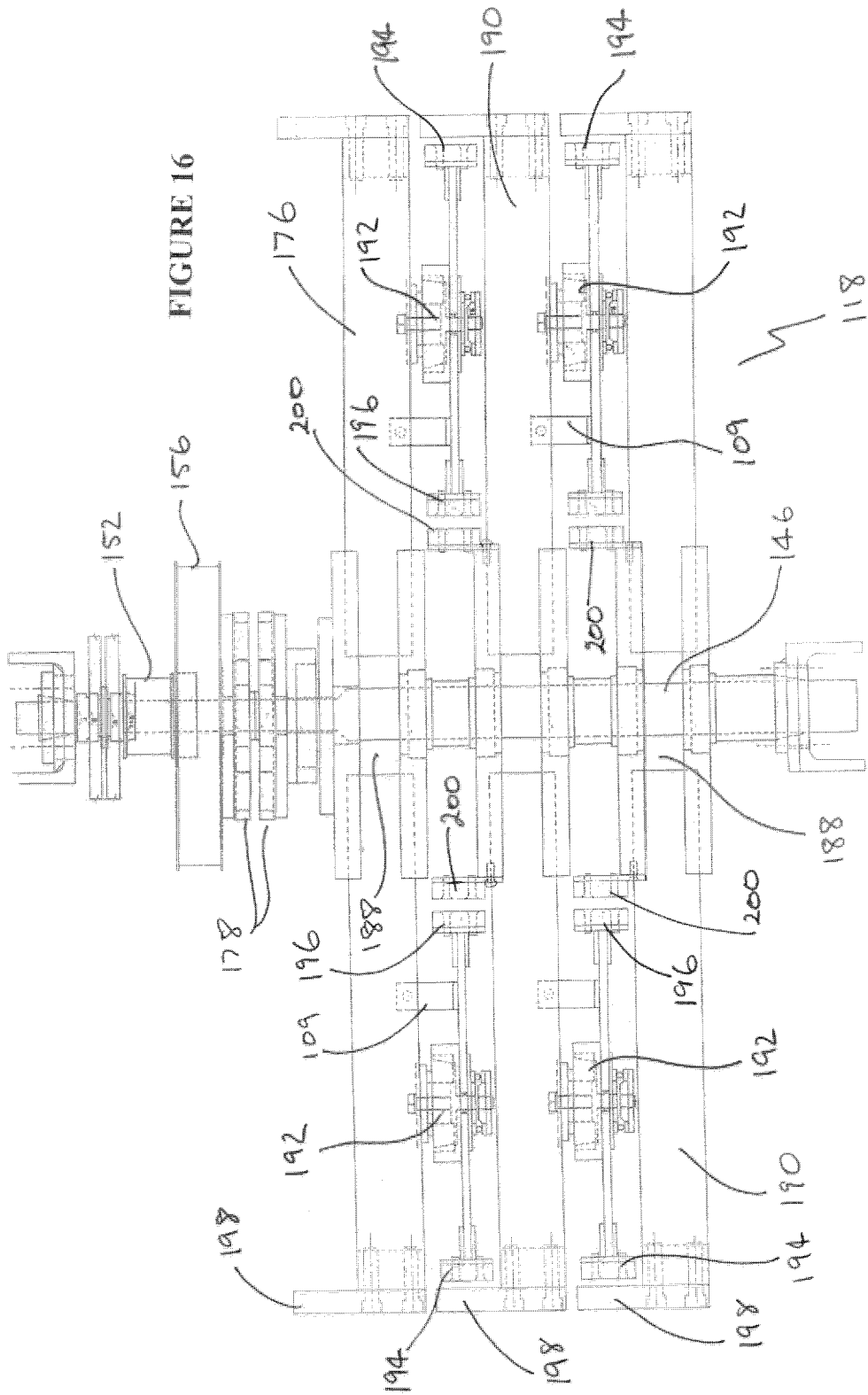
FIG. 16 is a diagrammatic partial sectional view of a kinetic energy transfer system embodied by the invention incorporating a plurality of accumulator members of the type shown in FIG. 11 and the input drive mechanism shown in FIG. 12.

A partial diagrammatic view of a kinetic energy accumulator incorporating accumulator members of the type shown in FIG. 11 is illustrated in FIG. 16. As indicated in that figure, the first slave pulley 152 and the second slave pulley 156 are rotatably mounted on, and coaxial with, the fixed axle 146. Further, it will be understood the magnetic coupling 178 comprises upper and lower arrays of permanent rare earth magnets arranged in oppositely poled orientation to attract each other. Each of the central hubs 188 of the respective accumulator members 176, 190 are rotatable about thrust bearings mounted on the fixed axle 146 as is the first slave pulley 152 and the upper and lower halves of the magnetic coupling 178. The respective velocity responsive coupling members 192 of this embodiment are again respectively pivotally mounted to the underside of the first and second accumulator members 176 and 190. Moreover, as in embodiments described above, the outer arrays of permanent rare earth magnets 194 of the coupling members 192 magnetically couple with the outer peripheral ferromagnetic ring 198 of a respective successive accumulator member while the inner array of permanent rare earth magnets 196 of the coupling members 192 are repulsed by the inner ring of permanent rare earth magnets 200 of the accumulator members.

Figure 2:
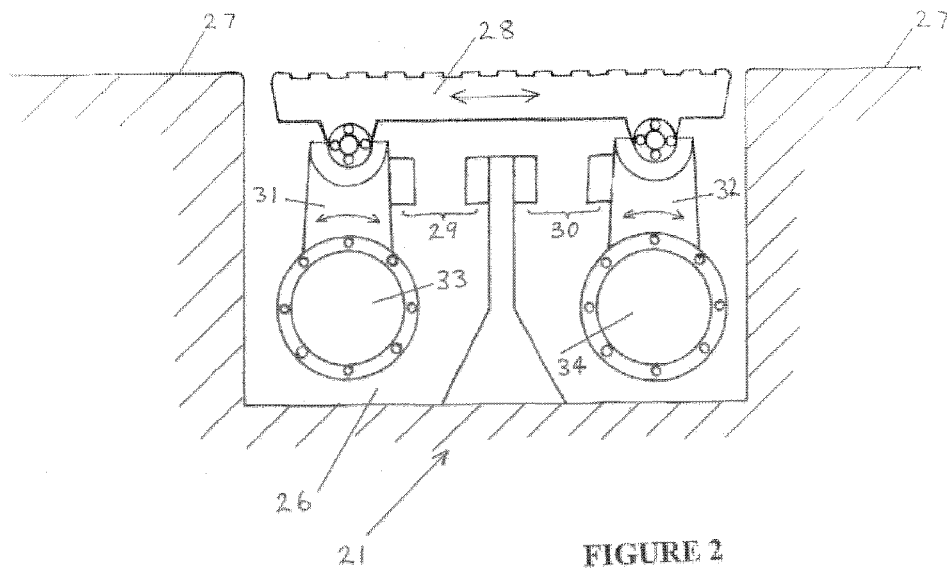
FIG. 2 is a diagrammatic representation of an energy transmitter component of the system.

An energy transmitter mechanism 202 of the type illustrated by FIG. 2 is shown in FIGS. 17 to 20. The transmitter mechanism is shown in position in a recess 204 in a road surface 206 and is provided with a substantially flat actuator plate 208 arranged to be driven over by motor vehicles. Upon a vehicle contacting the actuator plate 208, the plate is moved substantially linearly in the direction of travel of the vehicle. Permanent magnets are arranged to return the actuator plate 208 to its neutral position upon the vehicle leaving the plate as described further below.

The transmitter mechanism 202 is rotatably coupled to the input drive mechanism 116 of a kinetic energy accumulator of the type shown in FIG. 16 by a drive shaft 210 indicated in phantom outline and which is rotated back and forth about its axis with the movement of the actuator plate 208.

Figure 19:
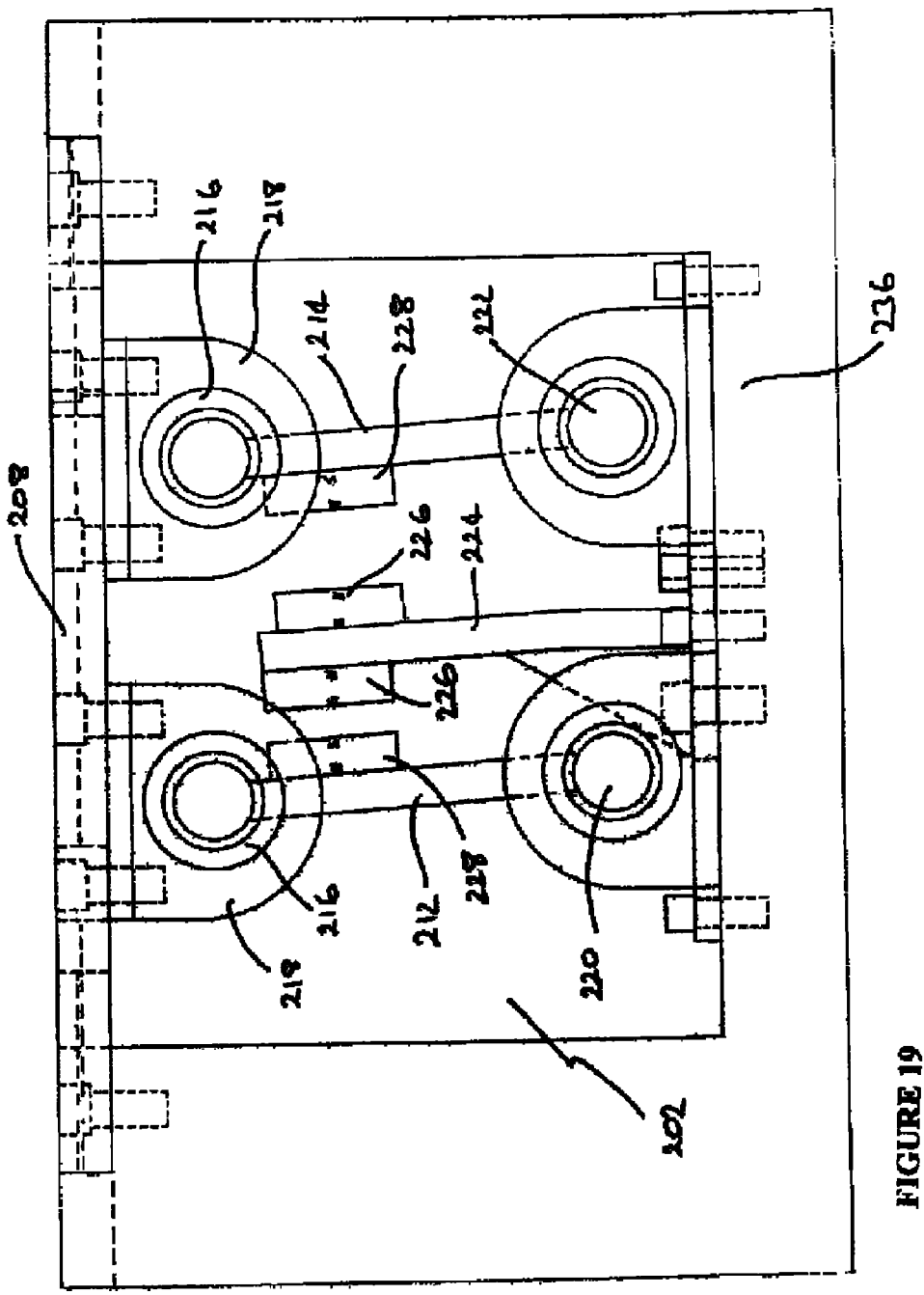
FIG. 19 is a diagrammatic end view of the energy transmitter component of the kinetic energy transfer system of FIG. 17.

The actuator plate 208 is rotatably coupled to a plurality of pairs of rotatably mounted radial arms 212 and 214 as more clearly shown in FIG. 19. More particularly, each of the radial arms is rotatably coupled to the actuator plate 208 at outer ends thereof via bearings 216 mounted in bearing housings 218. The opposite radially inner end of radial arm 212 is rotatably coupled to a bearing mounted idler shaft 220, while the opposite inner radial end of arm 214 is rotatably coupled to a bearing mounted drive shaft 222. As can be seen from FIG. 17 and FIG. 18, the drive shaft 222 is in turn coupled to the drive shaft 210. As also shown in FIG. 17, the transmitter mechanism 202 includes a plurality of supports 224, one of which is disposed between each pair of radial arms.

As better shown in FIG. 19, permanent rare earth magnets 226 are mounted at the upper end of each support 224 in opposite (repulsively poled) orientation to further permanent rare earth magnets 228 mounted on the radial arms 212 and 214.

Upon the actuator plate 208 being driven from its neutral position by contact with a vehicle, the plate is moved substantially linearly in a transverse direction to the longitudinal axis of the energy transmitter mechanism 202 (i.e., to the left in FIG. 19). As a result, the radial arms 212 and 214 are rotated about their respective axes of rotation, and driveshaft 222 is rotated in the anti-clockwise direction. The movement of radial arms 214 move the magnets 228 on those arms into proximity of the opposing poled magnets 226 mounted on the supports 224, thereby buffering the movement of the actuator plate 208 and driving the return of the radial arms and thereby the actuator plate to its neutral position upon the vehicle leaving the plate. As will also be understood, the magnets 228 on the radial arms 212 act in association with the magnets 226 on the corresponding side of the supports 224 to buffer the return of the actuator plate 208 to its neutral position. The back and forth rotation of the drive shaft with movement of the actuator plate to and from its neutral position thereby provides intermittent rotational drive to the input drive mechanism 116. As shown in FIG. 20, opposite side margins of the actuator plate 208 are provided with spaced apart finger extensions 230 slideably interposed between corresponding finger extensions 232 on fixed cover plates 234, thereby inhibiting ingress of debris into the interior region under the actuator plate.

The kinetic energy transmitter mechanism is fixedly mounted inside a concrete casing 236 which is plumbed to a drainage system indicated by the numeral 238 via drainage conduit 240 via an outlet 242 provided in the base region of the concrete casing 236, as indicated in FIG. 17 and FIG. 18.

While the actuator plate 208 in this embodiment is substantially flat, forms can be provided having a humped profile to act as a "speed bumps" for slowing motor vehicle traffic on a road or for instance, entering or leaving car parks or the like.

Any suitable permanent rare earth magnets can be utilised in embodiments as described herein, including neodymium (neodymium, iron and boron) magnets and samarium-cobalt magnets, and mixtures of such magnets.

It will, therefore, be appreciated by those skilled in the art that numerous variations and/or modifications can be made to the specific embodiments shown. All such variations and/or modifications are to be considered within the scope of the invention. The present embodiments are, therefore, to be considered in all respects as illustrative and not restrictive. For further example, a kinetic energy accumulator as described herein could be driven by a wind or solar powered turbine, or other source of substantially constant rotational drive. In this instance, the accumulator could be coupled to the constant rotational source via any appropriate drive (e.g., pulley based) or gearing mechanism. Moreover, while the invention has been described with reference to the energy transmitter mechanism comprising an actuator plate arranged to be driven over by a vehicle, it will be understood that any energy transmitter mechanism for transferring rotational drive from the kinetic energy source to the kinetic energy accumulator can be utilized, including any conventionally known such mechanism for transmitting drive from ocean wave, swell or tide motion.

The invention claimed is:

1. A kinetic energy accumulator, comprising:
   (a) a plurality of rotatably mounted accumulator members positioned adjacent one another;
   (b) an input drive mechanism arranged to impart rotational drive to a first of the accumulator members;
   (c) velocity responsive coupling members arranged to magnetically couple successive ones of the accumulator members without contact between the velocity responsive coupling members and the accumulator members, when respective ones of the accumulator members are caused successively to rotate with an angular velocity equal to, or greater than, a predetermined velocity; and
   wherein each of the coupling members have a radially outer end and an opposite radially inner end, the outer end being adapted to magnetically couple with a radially outer peripheral region of a respective successive one of the accumulator members, and the radially inner end of each said coupling member is magnetically repulsed from a radially inner central region of the respective successive said accumulator member whereby the coupling member is restrained from assuming a functional position from an initial neutral position, and each coupling member is weighted to move to the functional position under the influence of centrifugal force with the rotation of an associated said accumulator member at said angular velocity equal to, or greater than, the predetermined velocity, the coupling members effecting the magnetic coupling when in their functional positions.

2. A kinetic energy accumulator according to claim 1 wherein the accumulator members are mounted for rotation about a common axis.

3. A kinetic energy accumulator according to claim 1 wherein the accumulator members are mounted on a common fixed axle, the accumulator members each being rotatable relative to the axle.

4. A kinetic energy accumulator according to claim 1 wherein the input drive mechanism includes a unidirectional clutch for imparting the rotational drive to the first of the accumulator members.

5. A kinetic energy accumulator according to claim 1 wherein each said coupling member is arranged to pivot about a respective pivot axis from the neutral position to the functional position in response to the rotation of its associated said accumulator member.

6. A kinetic energy accumulator according to claim 1 wherein the magnetic repulsion between each said coupling member and the radially inner central region of the respective successive said accumulator member is of a magnitude to return the coupling member to the neutral position upon the angular velocity of the associated said accumulator member falling below the predetermined velocity.

7. A kinetic energy accumulator according to claim 1 wherein permanent magnets or magnetically attracted material are provided at the outer peripheral region of respective of the coupling members for effecting the magnetic coupling between the coupling members and respective of the successive said accumulator members.

8. A kinetic energy accumulator according to claim 7 comprising said permanent magnets wherein the permanent magnets are provided at the outer peripheral region of each of the coupling members and are arranged to magnetically couple with magnetically attracted material arranged around the outer peripheral region of the respective successive said accumulator member.

9. A kinetic energy accumulator according to claim 7 comprising said magnetically attracted material wherein the magnetically attracted material is ferromagnetic material.

10. A kinetic energy accumulator according to claim 7 comprising said permanent magnets wherein the permanent magnets are provided at the outer peripheral region of respective of the coupling members and are arranged to magnetically couple with permanent magnets arranged around the outer peripheral region of the respective successive said accumulator member.

11. A kinetic energy transfer system, comprising:
an energy accumulator comprising a plurality of rotatably mounted accumulator members positioned adjacent one another, an input drive mechanism arranged to impart rotational drive to a first of the accumulator members, and velocity responsive coupling members arranged to magnetically couple successive ones of the accumulator members without contact between the velocity responsive coupling members and the accumulator members, when respective ones of the accumulator members are caused successively to rotate with an angular velocity equal to, or greater than, a predetermined velocity;
an energy transmitter mechanism arranged to apply drive from a kinetic energy source to the input drive mechanism of the energy accumulator;
a load device coupled to, and arranged to be driven by, the energy accumulator when each of the accumulator members is rotating with an angular velocity equal to, or greater than, the predetermined velocity, and
wherein the input drive mechanism has (a) first and second drive means, the second drive means being arranged to drive the rotation of the first said accumulator member of the energy accumulator, (b) a unidirectional clutch, and (c) a drive system for being driven by the energy transmitter mechanism and including a first element for driving rotation of the first drive means and a second element for driving rotation of the second drive means, and wherein the second element is arranged to be rotatably driven by, and is rotatable relative to, the first element, the first element and the first drive means having a higher drive ratio compared to the second element and the second drive means, and the first drive means is arranged to drive rotation of the second drive means via the unidirectional clutch.

12. A kinetic energy transfer system according to claim 11 wherein the input drive mechanism includes a magnetic coupling for imparting the rotational drive from the second drive element to the energy accumulator.

13. A kinetic energy transfer system according to claim 11 further comprising a centrifugal clutch for being driven by the energy accumulator and transferring the rotational drive from the energy accumulator to the load device.

14. A kinetic energy transfer system, comprising:
an energy accumulator comprising a plurality of rotatably mounted accumulator members positioned adjacent one another, an input drive mechanism arranged to impart rotational drive to a first of the accumulator members, and velocity responsive coupling members arranged to magnetically couple successive ones of the accumulator members without contact between the velocity responsive coupling members and the accumulator members, when respective ones of the accumulator members are caused successively to rotate with an angular velocity equal to, or greater than, a predetermined velocity;
an energy transmitter mechanism arranged to apply drive from a kinetic energy source to the input drive mechanism of the energy accumulator; and
a load device coupled to, and arranged to be driven by, the energy accumulator when each of the accumulator members is rotating with an angular velocity equal to, or greater than, the predetermined velocity; and
wherein each of the coupling members have a radially outer end and an opposite radially inner end, the outer end being adapted to magnetically couple with a radially outer peripheral region of a respective successive one of the accumulator members, and wherein the radially inner end of each said coupling member is magnetically repulsed from a radially inner central region of the respective successive said accumulator member whereby the coupling member is restrained from assuming a functional position from an initial neutral position, and each coupling member is weighted to move to the functional position under the influence of centrifugal force with the rotation of an associated said accumulator member at said angular velocity equal to, or greater than, the predetermined velocity, the coupling members effecting the magnetic coupling when in their functional positions.

15. A kinetic energy transfer system according to claim 14 wherein the input drive mechanism comprises:
(a) first and second drive means, the second drive means being arranged to drive the rotation of the first said accumulator member of the energy accumulator;
(b) a unidirectional clutch; and
(c) a drive system for being driven by the energy transmitter mechanism and including a first element for driving rotation of the first drive means and a second element for driving rotation of the second drive means, wherein the second element is arranged to be rotatably driven by, and is rotatable relative to, the first element, the first element and the first drive means have a higher drive ratio compared to the second element and the second drive means, and the first drive means is arranged to drive rotation of the second drive means via the unidirectional clutch.

16. A kinetic energy transfer system according to claim 14 wherein the input drive mechanism includes a magnetic coupling for imparting the rotational drive from the second drive element to the energy accumulator.

17. A kinetic energy system according to claim 14 further comprising a centrifugal clutch for being driven by the energy accumulator and transferring the rotational drive from the energy accumulator to the load device.

* * * * *